(12) United States Patent
Fujishima et al.

(10) Patent No.: US 8,406,913 B2
(45) Date of Patent: Mar. 26, 2013

(54) CONTROLLING FEED OPERATIONS OF A MACHINE TOOL AND WORK-PIECE RELATIVE TO A PROGRAMMED FIXED CYCLE

(75) Inventors: Makoto Fujishima, Nara (JP); Hideki Takedomi, Nara (JP)

(73) Assignee: Mori Seiki Co., Ltd., Nara (JP)

( * ) Notice: Subject to any disclaimer, the term of this patent is extended or adjusted under 35 U.S.C. 154(b) by 334 days.

(21) Appl. No.: 12/971,717

(22) Filed: Dec. 17, 2010

(65) Prior Publication Data

US 2011/0190925 A1 Aug. 4, 2011

(30) Foreign Application Priority Data

Jan. 29, 2010 (JP) ................................. 2010-018246

(51) Int. Cl.
*G06F 19/00* (2006.01)
(52) U.S. Cl. .......................................... 700/173; 700/28
(58) Field of Classification Search .................. 700/173, 700/159, 28
See application file for complete search history.

(56) References Cited

U.S. PATENT DOCUMENTS

| | | | | | |
|---|---|---|---|---|---|
| 4,023,861 | A | * | 5/1977 | Schnell | 299/1.8 |
| 4,092,884 | A | * | 6/1978 | King | 82/110 |
| 4,331,051 | A | * | 5/1982 | Gerber et al. | 83/74 |
| 4,380,944 | A | * | 4/1983 | Gerber et al. | 83/49 |
| 4,469,654 | A | * | 9/1984 | Haskett et al. | 264/618 |
| 4,663,721 | A | * | 5/1987 | Herscovici | 700/160 |
| 4,666,352 | A | * | 5/1987 | Nagao et al. | 409/153 |
| 4,777,603 | A | * | 10/1988 | Woodman et al. | 700/159 |
| 4,790,698 | A | * | 12/1988 | Heffron | 409/200 |

(Continued)

FOREIGN PATENT DOCUMENTS

| | | |
|---|---|---|
| EP | 510204 A1 * | 10/1992 |
| JP | 10-063329 | 6/1998 |

(Continued)

OTHER PUBLICATIONS

Bearee, R.; Barre, P.-J.; and Bloch, S., "Influence of High-Speed Machine Tool Control Parameters on the Contouring Accuracy. Application to Linear and Circular Interpolation", 2004, Journal of Intelligent and Robotic Systems, vol. 40, pp. 321-342.*

(Continued)

*Primary Examiner* — Mohammad Ali
*Assistant Examiner* — Kelvin Booker
(74) *Attorney, Agent, or Firm* — WPAT, P.C.; Anthony King (57) ABSTRACT

A controller for machine tool 1 has a program analyzing section 12 for analyzing a machining program and extracting a fixed cycle command, a parameter setting section 15 for, on the basis of the extracted fixed command, determining an accuracy level being graded into a plurality of grades depending on how high machining accuracy is prioritized as compared with machining time in machining and setting parameters corresponding to the determined accuracy level and relating to control of the operation of a feed mechanism 30, and a drive control section 17 for controlling the feed mechanism 30 on the basis of the extracted fixed cycle command and the set parameters. The parameter setting section 15 calculates an arc-shaped movement trajectory of a tool moving around a virtual corner portion where two straight lines intersect with each other which corresponds to the parameters, and determines the accuracy level based thereon.

7 Claims, 10 Drawing Sheets

U.S. PATENT DOCUMENTS

| | | | | |
|---|---|---|---|---|
| 4,907,164 | A * | 3/1990 | Guyder | 700/173 |
| 4,910,922 | A * | 3/1990 | Kotthaus et al. | 451/253 |
| 4,941,780 | A * | 7/1990 | Takahashi | 407/114 |
| 5,288,209 | A * | 2/1994 | Therrien et al. | 416/193 R |
| 5,782,589 | A * | 7/1998 | Cole | 408/233 |
| 5,815,400 | A * | 9/1998 | Hirai et al. | 700/173 |
| 5,869,548 | A * | 2/1999 | Ikushima et al. | 523/116 |
| 5,882,786 | A * | 3/1999 | Nassau et al. | 428/336 |
| 6,021,695 | A * | 2/2000 | Kosho et al. | 82/122 |
| 6,158,927 | A * | 12/2000 | Cole et al. | 407/48 |
| 6,189,427 | B1 * | 2/2001 | Kosho et al. | 82/122 |
| 6,401,004 | B1 * | 6/2002 | Yamazaki et al. | 700/159 |
| 6,506,004 | B1 * | 1/2003 | Kohlhase et al. | 409/131 |
| 6,604,015 | B2 * | 8/2003 | Iriguchi et al. | 700/187 |
| 6,632,053 | B2 * | 10/2003 | Koch | 409/132 |
| 6,722,826 | B2 * | 4/2004 | Cavanaugh | 409/143 |
| 6,748,834 | B2 * | 6/2004 | Corbin et al. | 82/1.11 |
| 6,772,039 | B2 * | 8/2004 | Kakino et al. | 700/160 |
| 6,782,306 | B2 * | 8/2004 | Yutkowitz | 700/189 |
| 6,819,974 | B1 * | 11/2004 | Coleman et al. | 700/195 |
| 6,994,001 | B2 * | 2/2006 | Krukov | 82/11 |
| 7,351,050 | B2 * | 4/2008 | Vanderploeg et al. | 425/126.1 |
| 7,407,618 | B2 * | 8/2008 | Vanderploeg et al. | 264/509 |
| 7,659,682 | B2 * | 2/2010 | Matsumoto et al. | 318/625 |
| 7,862,050 | B2 * | 1/2011 | Koshino | 279/133 |
| 8,177,459 | B2 * | 5/2012 | Hughes et al. | 407/40 |
| 2002/0128742 | A1 * | 9/2002 | Zieverink | 700/159 |
| 2002/0156541 | A1 * | 10/2002 | Yutkowitz | 700/28 |
| 2002/0161469 | A1 * | 10/2002 | Faulkner et al. | 700/118 |
| 2003/0023341 | A1 * | 1/2003 | Sagawa et al. | 700/159 |
| 2003/0125829 | A1 * | 7/2003 | Kakino et al. | 700/188 |
| 2004/0226155 | A1 * | 11/2004 | Krukov | 29/27 R |
| 2005/0280187 | A1 * | 12/2005 | Vanderploeg et al. | 264/328.1 |
| 2007/0228673 | A1 * | 10/2007 | Koshino | 279/128 |
| 2008/0012520 | A1 * | 1/2008 | Matsumoto et al. | 318/630 |
| 2010/0129165 | A1 * | 5/2010 | Hughes et al. | 407/42 |

FOREIGN PATENT DOCUMENTS

| | | | | |
|---|---|---|---|---|
| JP | | 2007203457 A | * | 8/2007 |

OTHER PUBLICATIONS

Hecker, R.L.; Glores, G.M.; Xie, Q.; and Haran, R., "Servocontrol of Machine-Tools: A Review", 2008, Latin American Applied Research, vol. 38, pp. 85-94.*

HeidenHain Corporation, "Machining Accuracy of Machine Tools", 2008, HeidenhalNfo-Machine Tool, vol. 2.*

Kim, D.-I.; Song, J.-I.; Kim, S., "Dependence of Machining Accuracy on Acceleration/Deceleration and Interpolation Methods in CNC Machine Tools", 1994, Record of the 1994 IEEE Conference on Industry Applications, Society Annual Meeting, vol. 3, pp. 1898-1905.*

Koren, Y.; and Lo, C.C., "Advanced Controllers for Feed Drives", 1992, Proceedings of the 1992 American Control Conference.*

Koren, Y., "Manufacturing Perspective—Adaptive Control Systems for Machining", 1989, American Society of Mechanical Engineers.*

Ni, J., "CNC Machine Accuracy Enhancement Through Real-Time Error Compensation", Nov. 1997, Journal of Manufacturing Science and Engineering, vol. 119.*

Rahman, M., "Modeling and Measurement of Multi-Axis Machine Tools to Improve Positioning Accuracy in a Software Way", 2004, Production Technology Laboratory, Department of Mechanical Engineering, University of Oulu.*

Ulsoy, A.G. and Koren, Y., "Applications of Adaptive Control to Machine Tool Process Control", Jun. 1989, IEEE Control Systems Magazine.*

Yao, B., "Adaptive Robust Control of Nonlinear Systems with Application to Control of Mechanical Systems", 1996, Dissertation, Doctor of Philosophy in Mechanical Engineering, Graduate Division of the University of California at Berkeley.*

* cited by examiner

CONTROLLING FEED OPERATIONS OF A MACHINE TOOL AND WORK-PIECE RELATIVE TO A PROGRAMMED FIXED CYCLE

TECHNICAL FIELD

The present invention relates to a controller for machine tool for controlling the operation of a feed mechanism which relatively moves a tool and a workpiece according to a machining program related to a fixed cycle.

BACKGROUND ART

In the field of machining, there has conventionally been a demand for improvement of machining efficiency. For this purpose, a relative movement of a tool and a workpiece is controlled in the following manner, for example (see the Japanese Unexamined Patent Application Publication No. 10-63329). That is, when a tool which is moving according to an operation command comes close to a specified position, the tool begins to decelerate in order to stop at the specified position and the tool begins to accelerate toward the next specified position to move according to the next operation command. When the movement of a tool is controlled in this manner, before the movement of the tool is completed and the tool is stopped, the subsequent movement is started. Therefore, the movement time of the tool, that is, the machining time is shortened.

SUMMARY OF INVENTION

Technical Problem

However, when a tool is moved as described above, an error occurs between the specified trajectory (true movement trajectory) and the actual movement trajectory. Therefore, depending on the amount of the error, it is possible that machining accuracy is reduced.

Figure 16:
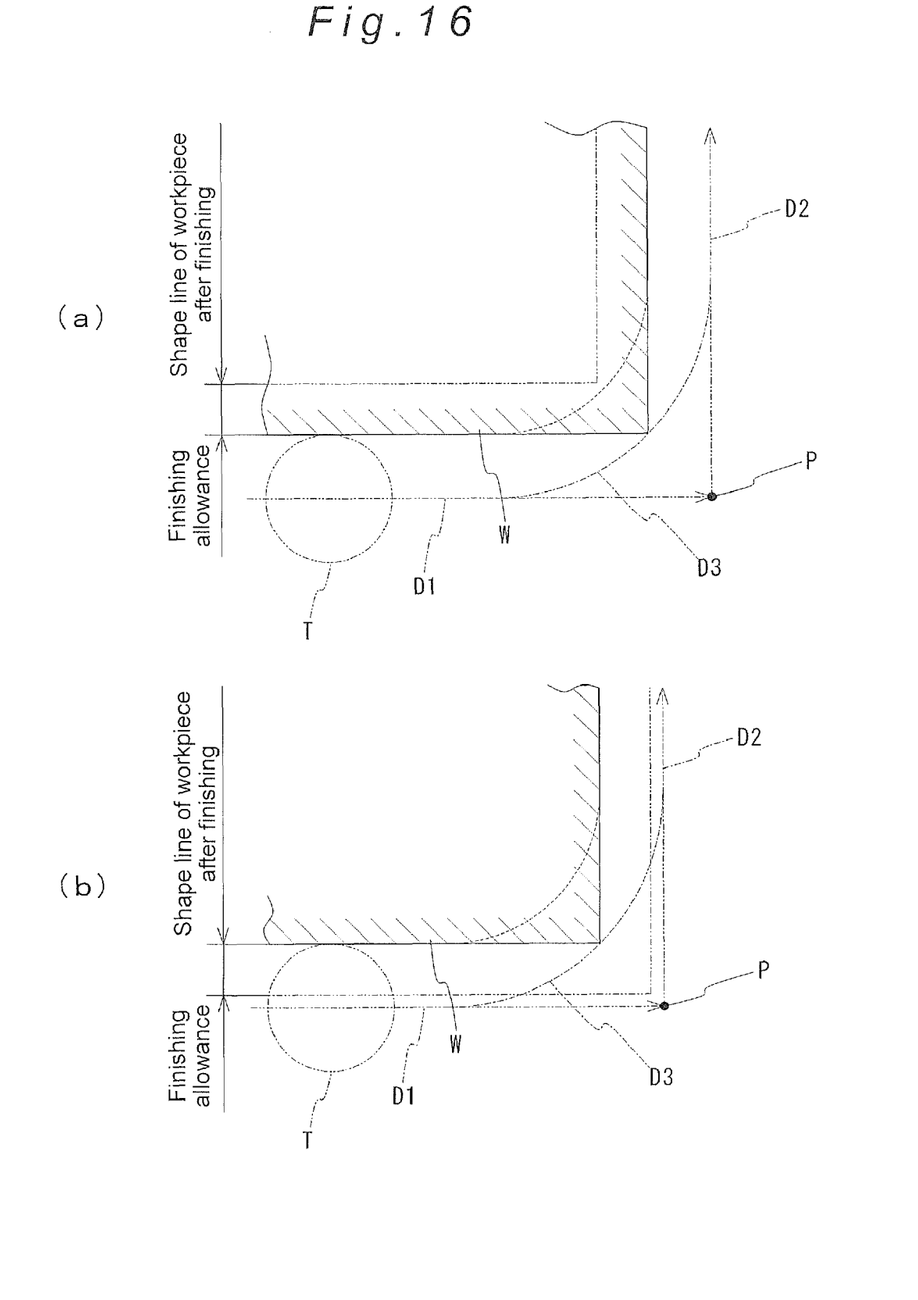
FIG. 16 is an illustration for explaining a problem in a conventional machining.

Specifically, as shown in FIG. 16, in a case where a specified trajectory D1 to a position P and a specified trajectory D2 from the position P to the next position are set, when a deceleration operation of an operation command for the commanded trajectory D1 and an acceleration operation of an operation command for the commanded trajectory D2 are performed simultaneously, a tool T moves along an arc-shaped movement trajectory D3 inside the position P and a workpiece W is correspondingly excessively machined.

A process for machining a workpiece W usually includes a rough cutting operation and a finishing operation, and in the rough cutting operation, the workpiece W is machined so that a finishing allowance remains. Therefore, even if the workpiece W is excessively machined, this may not immediately cause reduction of machining accuracy (see FIG. 16(a)). However, in the finishing operation, since the finishing allowance portion is machined, if the workpiece W is machined too much, the portion thereof which is included in its shape after finishing is machined, thereby causing reduction of machining accuracy (see FIG. 16 (b)).

Therefore, if the amount of the error at the position P (the amount of the excessive machining of the workpiece W) is controlled and the tool T is moved so that the workpiece W is not machined up to the portion thereof which is included in its shape after finishing, the accuracy of machining the workpiece W is not reduced and further shortening of the machining time can be achieved.

The present invention has been achieved in view of the above-described circumstances, and an object thereof is to provide a controller for machine tool capable of shortening machining time without reducing machining accuracy in machining of a workpiece.

Solution to Problem

The present invention, for achieving the above-described object, relates to a controller for machine tool which is provided for a machine tool having a feed mechanism for relatively moving a tool and a workpiece, and which controls the operation of the feed mechanism according to a machining program related to a fixed cycle, the controller for machine tool comprising:

program storage means for storing the machining program related to the fixed cycle;

program analyzing means for analyzing the machining program stored in the program storage means and extracting a fixed cycle command;

parameter setting means for determining an accuracy level on the basis of the fixed cycle command extracted by the program analyzing means and setting parameters which correspond to the accuracy level and relate to the control of the operation of the feed mechanism, the accuracy level being graded into a plurality of grades depending on how high machining accuracy is prioritized as compared with machining time in machining; and drive control means for controlling the feed mechanism on the basis of the fixed cycle command extracted by the program analyzing means and the parameters set by the parameter setting means, and thereby relatively moving the tool, wherein:

the drive control means is configured to, for an intersection portion of two linear movement paths, relatively move the tool along an arc-shaped movement trajectory which depends on the parameters set by the parameter setting means, the movement trajectory touching the linear movement paths and being more distant from the intersection portion when the grade of the accuracy level is lower;

the parameter setting means is configured to recognize machining type on the basis of the fixed cycle command;

when the recognized machining type is finishing, the parameter setting means determines the accuracy level to be the highest grade of accuracy level and sets the parameters corresponding to the determined accuracy level; and when the recognized machining type is rough cutting, the parameter setting means virtually sets a vertical corner portion where two straight lines intersect with each other, and then determines the accuracy level to be the lowest grade of accuracy level among such accuracy levels that an arc-shaped movement trajectory of the tool moving around the virtual corner portion which depends on the parameters does not intersect with a linear offset line which is obtained by offsetting the two straight lines inwardly by a finishing allowance which is recognized from the fixed cycle command, and sets the parameters corresponding to the determined accuracy level, the movement trajectory touching the straight lines and being more distant from the virtual corner portion when the grade of the accuracy level is lower.

According to this invention, a machining program for performing a predetermined machining (machining program related to a fixed cycle or machining program including a machining program related to a fixed cycle) is stored in advance in the program storage means. The above-mentioned fixed cycle makes it possible to, for a machining such as circumferential cutting, pocket hole machining and drilling, specify a series of machining operations with a fewer number of blocks than usual, and its command (fixed cycle command) includes data on at least one or more of machining type, finishing allowance, feed speed, depth of cut per cutting, total depth of cut, number of times of cutting, etc.

The program analyzing means analyzes the machining program stored in the program storage means and extracts a fixed cycle command, and then the parameter setting means determines an accuracy level on the basis of the fixed cycle command extracted, and sets parameters which correspond to the accuracy level and relate to the control of the operation of the feed mechanism for relatively moving the tool and the workpiece.

The accuracy level is graded into a plurality of grades depending on how machining accuracy is prioritized as compared with the machining time in machining the workpiece. For example, machining accuracy is prioritized higher (machining time is longer) in a higher grade of accuracy level, and machining time is prioritized higher (machining time is shorter) in a lower grade of accuracy level. Therefore, the accuracy level is set to a low grade for rough cutting and is set to a high grade for finishing. Further, as the above-described parameters, for example, maximum acceleration for acceleration/deceleration before interpolation, acceleration change time for acceleration/deceleration before interpolation, allowable amount of acceleration change, allowable amount of acceleration change for each axis at linear corner, rate of jerk change time for smooth-bell-shaped acceleration/deceleration, allowable acceleration for circular interpolation, time constant for acceleration/deceleration after interpolation, allowable speed difference at corner, maximum machining speed etc. are given.

The determination of the accuracy level by the parameter setting means is performed in the following manner. Machining type is initially recognized on the basis of the fixed cycle command. When the recognized machining type is finishing, the accuracy level is determined to be the highest grade of accuracy level. On the other hand, when the recognized machining type is rough cutting, a virtual corner portion where two straight lines intersect with each other is virtually set, and then the lowest grade of accuracy level among such accuracy levels that an arc-shaped movement trajectory of a tool moving around the virtual corner portion which depends on the parameters, and which touches the straight lines and is more distant from the virtual corner portion when the grade of the accuracy level is lower does not intersect with a linear offset line which is obtained by offsetting the two straight lines inwardly by a finishing allowance which is recognized from the fixed cycle command is recognized, thereby determining the accuracy level. It is noted that the term "inwardly" used above refers to the side on which the movement trajectory is set.

After the accuracy level is determined in this manner and the parameters are set, the feed mechanism is controlled by the drive control means on the basis of the set parameters and the fixed cycle command extracted by the program analyzing means and thereby the tool is moved relative to the workpiece. At this time, at an intersection portion of two linear movement paths, the tool is moved relatively along an arc-shaped movement trajectory which depends on the set parameters and which touches the linear movement paths and is more distant from the intersection portion when the grade of the accuracy level is lower.

Thus, according to the controller for machine tool of the present invention, when the machining type recognized from the fixed cycle command is finishing, the accuracy level is determined to be the highest grade of accuracy level and the parameters corresponding to the determined accuracy level are set, and when the machining type recognized from the fixed cycle command is rough cutting, the accuracy level is determined to be the lowest grade of accuracy level among such accuracy levels that the arc-shaped movement trajectory does not intersect with the linear offset line and the parameters corresponding to the determined accuracy level are set. Therefore, it is possible to shorten the machining time as much as possible while maintaining machining accuracy.

A configuration may be employed in which: the parameter setting means is configured to, when the machining type recognized from the fixed cycle command is a machining in which a cutting is performed a plurality of times, for cuttings corresponding to rough cutting thereof, determine, for each of them, the accuracy level to be the lowest grade of accuracy level among such accuracy levels that the movement trajectory does not intersect with a linear offset line which is obtained by offsetting the two straight lines inwardly by the remaining amount to be machined that is the amount to be machined to remain after the cutting, and set the parameters corresponding to the determined accuracy level, and for a cutting corresponding to finishing thereof, determine the accuracy level to be the highest grade of the accuracy level and set the parameters corresponding to the determined accuracy level; and the drive control means is configured to relatively move the tool along an arc-shaped movement trajectory, which depends on the parameters being set by the parameter setting means for each cutting, at an intersection portion of two linear movement paths.

When thus configured, since the accuracy level is determined to the lowest grade of accuracy level among such accuracy levels that the movement trajectory does not intersect with the linear offset line and the parameters are set based thereon for each of cuttings corresponding to rough cutting and the accuracy level is determined to be the highest grade of accuracy level and the parameters are set based thereon for a cuffing corresponding to finishing, similarly to the above, it is possible to shorten the machining time as much as possible while maintaining machining accuracy.

It is noted that a machining in which a cutting is preformed a plurality of times includes both a machining in which only rough cutting is performed and a machining in which finishing is performed after rough cutting is performed. In the case of a machining in which finishing is performed after rough cutting is performed, a cutting corresponding to rough cutting and a cutting corresponding to finishing are recognized on the data included in the fixed cycle command.

The parameter setting means may be configured to, when determining the accuracy level, raise the accuracy level grade by grade from the most lower grade and thereby determine the accuracy level to be the lowest grade of accuracy level among such accuracy levels that the movement trajectory does not intersect with the linear offset line. When thus configured, it is possible to efficiently determine the accuracy level to be such an accuracy level that the machining time can be shortened without machining the workpiece too much.

The parameter setting means may be configured to, when determining the accuracy level, initially check whether the finishing allowance or the remaining amount to be machined is larger than a predetermined value, and when determining that it is larger than the predetermined value, raise the accuracy level grade by grade from the lowest grade and thereby determine the accuracy level to the lowest grade of accuracy level among such accuracy levels that the movement trajectory does not intersect with the linear offset line, and when determining that it is smaller than the predetermined value, raise the accuracy level grade by grade from an intermediate grade and thereby determine the accuracy level to the lowest grade of accuracy level among such accuracy levels that the movement trajectory does not intersect with the linear offset line.

It is not efficient to raise the accuracy level grade by grade from the lowest grade when the finishing allowance or the remaining amount of to be machined is small. Therefore, by, as described above, checking the size of the finishing allowance or remaining amount to be machined and raising the accuracy level grade by grade from an intermediate grade when the finishing allowance or the remaining amount to be machined is small, the accuracy level can be determined more efficiently. It is noted that the intermediate grade means a grade between the lowest grade and the highest grade.

The parameter setting means may be configured to, in a case of a machining in which a cutting is performed a plurality of times, when determining the accuracy level for cuttings after first cutting, raise the accuracy level grade by grade from the grade of the preceding cutting and thereby determine the accuracy level to the lowest grade of accuracy level among such accuracy levels that the movement trajectory does not intersect with the linear offset line.

It is not efficient to, when determining the accuracy level for each cutting, raise the accuracy level grade by grade from the lowest grade every time. Therefore, by, as described above, raising the accuracy level grade by grade from the grade of the preceding cutting, the accuracy level can be determined more efficiently.

Advantageous Effects of Invention

Thus, according to the controller for machine tool of the present invention, it is possible to shorten machining time without reducing machining accuracy in machining a workpiece.

DESCRIPTION OF EMBODIMENTS

Figure 1:
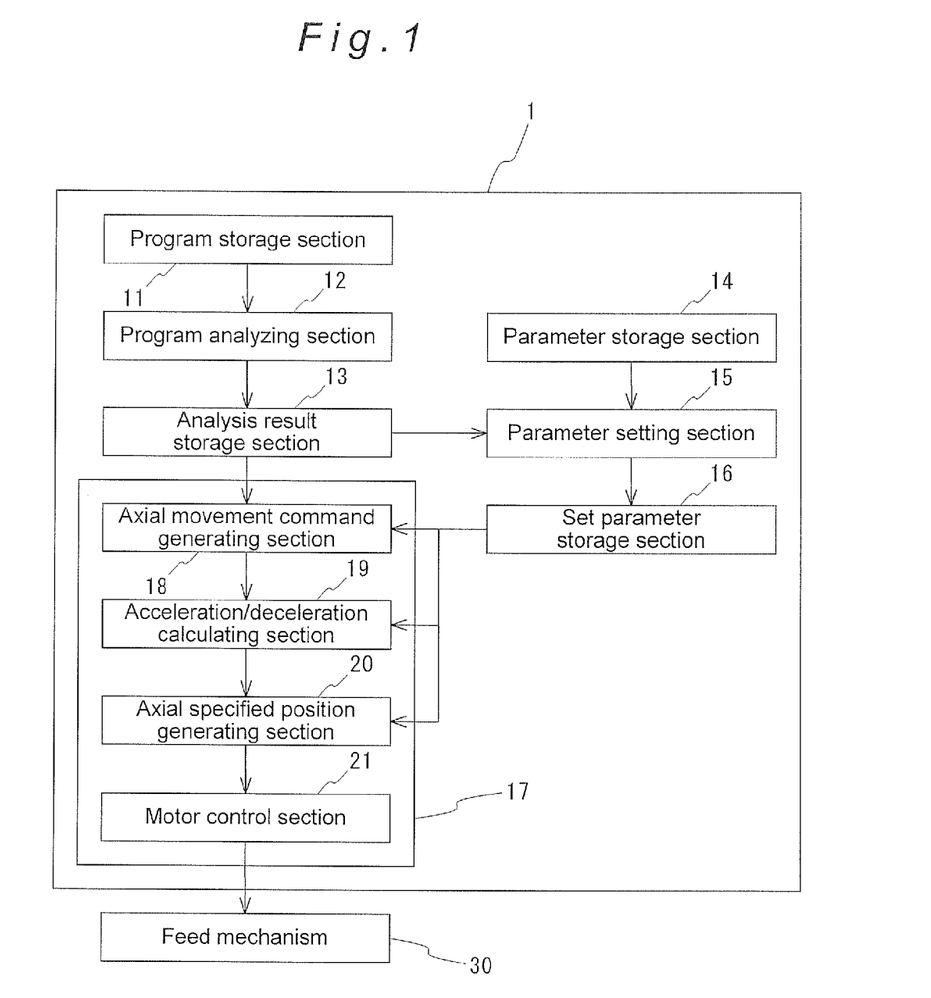
FIG. 1 is a block diagram showing a schematic configuration of a controller for NC machine tool and other components according to one embodiment of the present invention.

Hereinafter, a specific embodiment of the present invention will be described with reference to the accompanying drawings. FIG. 1 is a block diagram showing a schematic configuration of a controller for NC machine tool and other components according to the embodiment.

As shown in FIG. 1, a controller for NC machine tool 1 of the embodiment has a program storage section 11, a program analyzing section 12, an analysis result storage section 13, a parameter storage section 14, a parameter setting section 15, a set parameter storage section 16 and a drive control section 17, and is provided for an NC machine tool having a feed mechanism 30 for moving a tool T relative to a workpiece W and controls the operation of the feed mechanism 30.

A machining program related to a fixed cycle or a machining program including a machining program related to a fixed cycle, which is a machining program for performing a predetermined machining, is stored in the machining program storage section 11.

The fixed cycle makes it possible to specify a series of machining operations with a fewer number of blocks than usual for a machining such as circumferential cutting, pocket hole machining and drilling, for example. Its command (fixed cycle command) includes data on at least one or more of machining type, finishing allowance, feed speed, depth of cut per cutting, total depth of cut, number of times of cutting, etc.

Figure 2:
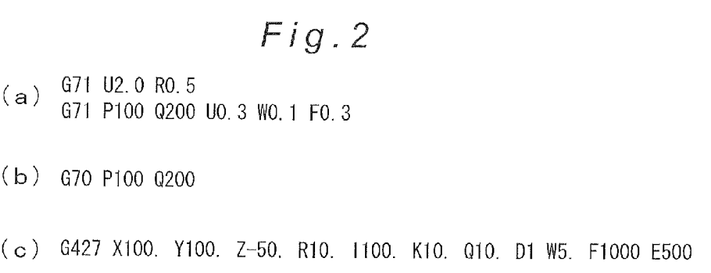
FIG. 2 is an illustration showing examples of a machining program which is stored in a program storage section of the embodiment.

FIG. 2 shows examples of the machining program stored in the program storage section 11. G71, U2.0, U0.3, W0.1 and F0.3 in FIG. 2(a) indicate machining type (rough cutting), depth of cut, finishing allowance in X-axis direction, finishing allowance in Z-axis direction and feed speed, respectively. G70 in FIG. 2(b) indicates machining type (finishing). G427, I100., K10., W5., F1000, and E500 in FIG. 2(c) indicate machining type (a machining in which finishing is performed after rough cutting is performed), total depth of cut, depth of cut per cutting in rough cutting, finishing allowance, feed speed for rough cutting and feed speed for finishing, respectively. The embodiment describes a mode in which an accuracy level is determined automatically (parameters are set automatically) from a machining program for either rough cutting or finishing as shown in FIGS. 2(a) and 2(b). A mode in which an accuracy level is determined automatically (parameters are set automatically) from a machining program for a machining in which a cutting is performed a plurality of times as shown in FIG. 2(c) will be described later.

The program analyzing section 12 analyzes the machining program stored in the program storage section 11 and extracts an operation command relating to movement position and feed speed of the tool T and the fixed cycle command. The extracted commands are stored in the analysis result storage section 13.

In the parameter storage section 14, parameters relating to the control of the operation of the feed mechanism 30 are stored. As the parameters, for example, maximum acceleration for acceleration/deceleration before interpolation, acceleration change time for acceleration/deceleration before interpolation, allowable amount of acceleration change, allowable amount of acceleration change for each axis at linear corner, rate of jerk change time for smooth-bell-shaped acceleration/deceleration, allowable acceleration for circular interpolation, time constant for acceleration/deceleration after interpolation, allowable speed difference at corner, maximum machining speed etc. are given.

Here, these parameters are briefly explained. Maximum acceleration for acceleration/deceleration before interpolation refers to the maximum acceleration at the time of acceleration/deceleration; acceleration change time for acceleration/deceleration before interpolation refers to the time before acceleration reaches the maximum acceleration at the time of acceleration/deceleration; allowable amount of acceleration change refers to an allowable value of the difference of acceleration occurring at an intersection of a linear command and a circular arc command; allowable amount of acceleration change for each axis at linear corner refers to an allowable value of the difference of acceleration occurring at an intersection of a linear command and a linear command; rate of jerk change time for smooth-bell-shaped acceleration/deceleration refers to the time before jerk reaches the maximum jerk at the time of acceleration/deceleration; allowable acceleration for circular interpolation refers to an allowable value of acceleration calculated from the relationship between acceleration and an error of circular arc radius occurring at the time of a circular interpolation command; time constant for acceleration/deceleration after interpolation refers to the time before speed on each feed axis reaches a specified speed; allowable speed difference at corner refers to an allowable value of the speed difference of each feed axis occurring at a corner portion; and maximum machining speed refers to the maximum speed which can be specified.

Figure 3:
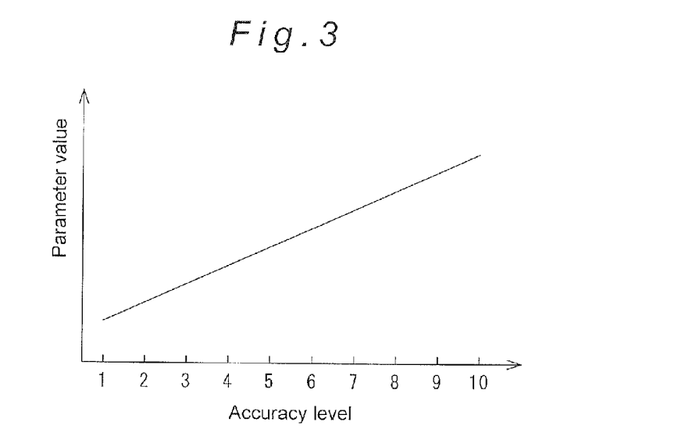
FIG. 3 is an illustration showing a relationship between accuracy level and parameter value.
Figure 4:
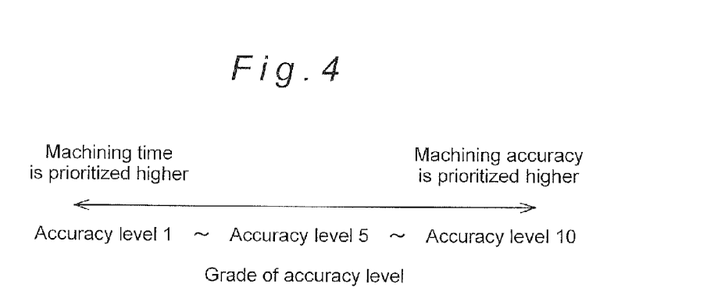
FIG. 4 is an illustration showing a relationship between the accuracy level, and machining accuracy and machining time.

These parameters can be stored in any format. In the embodiment, for example, for each these parameters, as shown in FIG. 3, a linear equation representing the relationship between accuracy level and parameter values is stored. The accuracy level is graded into a plurality of grades (in the embodiment, 10 grades of accuracy level 1 through accuracy level 10) depending on how high machining accuracy is prioritized as compared with machining time in machining the workpiece W. For example, machining accuracy is prioritized higher (machining time is longer) in a higher grade of accuracy level and machining time is prioritized higher (machining time is shorter) in a lower grade of accuracy of machining (see FIG. 4). Therefore, the accuracy level is set to a low grade for rough cutting and is set to a high grade for finishing.

The parameter setting section 15 determines the accuracy level and sets the parameters corresponding to the accuracy level on the basis of the fixed cycle command stored in the analysis result storage section 13 and the parameters stored in the parameter storage section 14. The set parameters are stored in the set parameter storage section 16.

Figure 5:
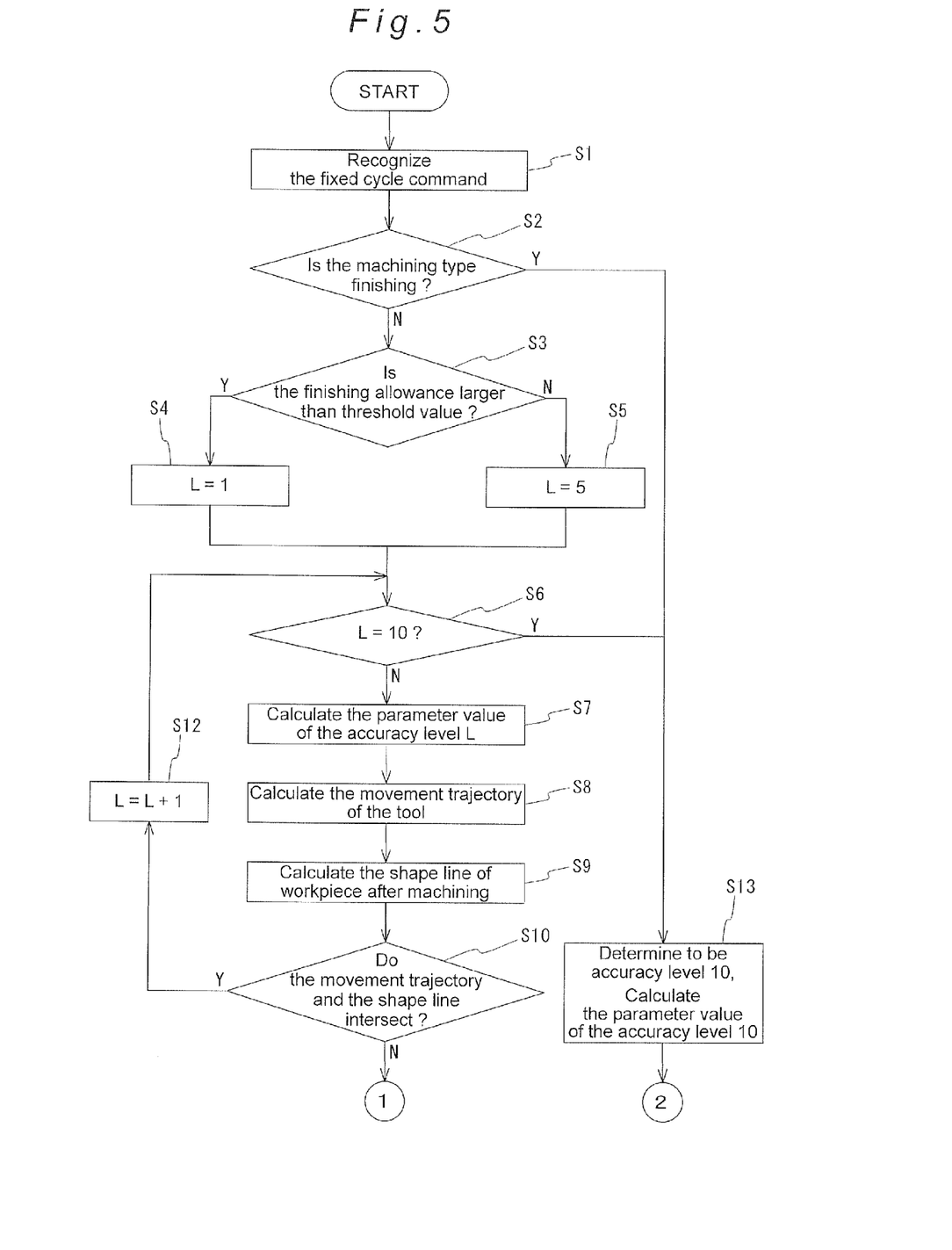
FIG. 5 is a flow chart showing a series of processings in a parameter setting section of the embodiment.
Figure 6:
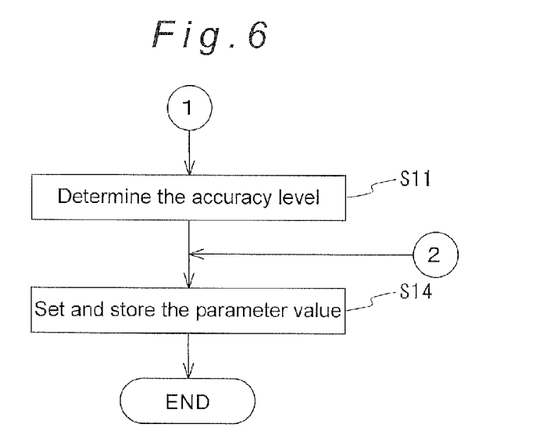
FIG. 6 is a flow chart showing the series of processings in the parameter setting section of the embodiment.

Specifically, the parameter setting section 15 performs a series of processings as shown in FIGS. 5 and 6. Initially, the fixed cycle command, that is, various data included in the fixed cycle command (for example, machining type, finishing allowance, feed speed etc.) is recognized (Step S1). Thereafter, a check is made whether the recognized machining type is finishing (Step S2), and when a determination is made that the machining type is not finishing, that is, when a determination is made that the machining type is rough cutting, a check is made whether the recognized finishing allowance is larger than a predetermined value (threshold value) (Step S3).

In Step S3, when a determination is made that the finishing allowance is larger than the predetermined value, the accuracy level is set to L=1 (Step S4), and when a determination is made that the finishing allowance is smaller than the predetermined value, the accuracy level is set to L=5 (Step S5). Thereafter, a check is made whether the accuracy level is L=10, that is, whether the accuracy level is the highest grade of accuracy level (Step S6). It is noted that the predetermined value (threshold value) is determined depending on the accuracy level which is to be set when a determination is made that the finishing allowance is smaller than it (in the embodiment, accuracy level 5).

When, in Step S6, a determination is made that the accuracy level is not L=10, a value of each of the parameters when the accuracy level is L ($1 \leq L \leq 9$) is calculated on the basis of the linear equations for the parameters (Step S7), and a movement trajectory C of the tool T is calculated on the basis of the calculated parameter values and the recognized feed speed (Step S8).

Figure 7:
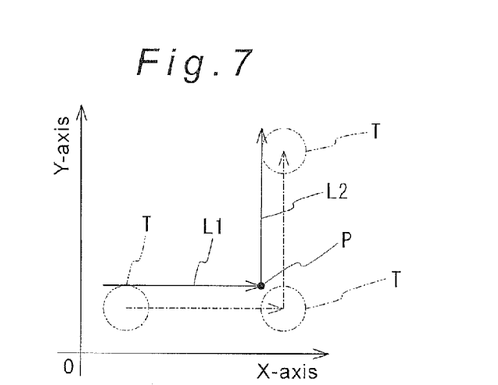
FIG. 7 is an illustration for explaining a parameter setting process in the embodiment.
Figure 8:
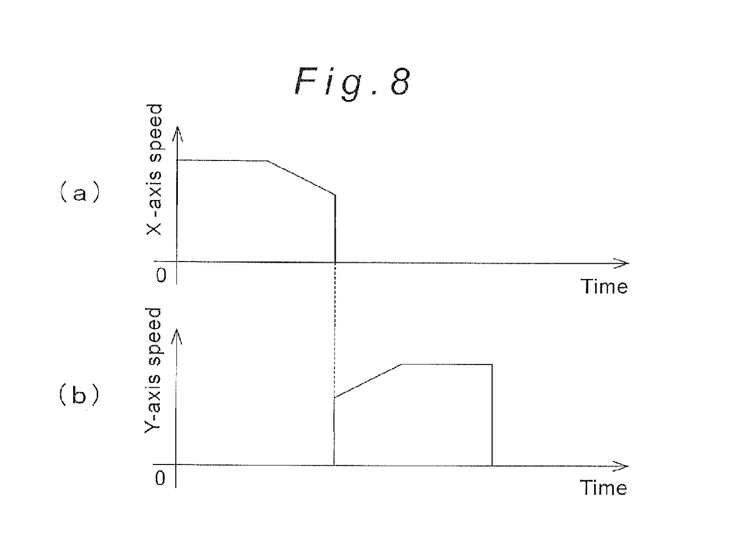
FIG. 8 is an illustration for explaining the parameter setting process in the embodiment.
Figure 9:
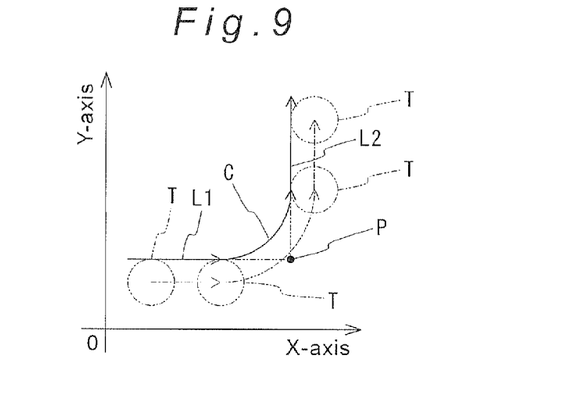
FIG. 9 is an illustration for explaining the parameter setting process in the embodiment.
Figure 10:
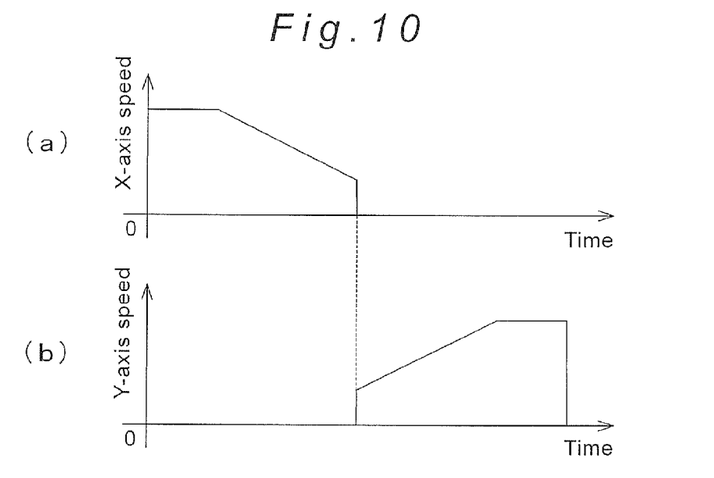
FIG. 10 is an illustration for explaining the parameter setting process in the embodiment.
Figure 11:
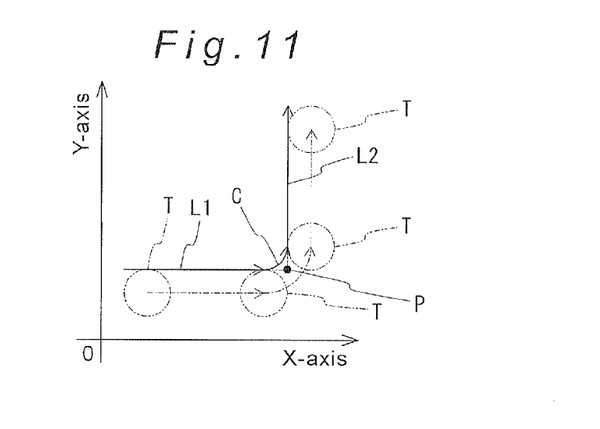
FIG. 11 is an illustration for explaining the parameter setting process in the embodiment.

Here, a method of calculating the movement trajectory C of the tool T is explained. Initially, as shown in FIG. 7, a virtual corner portion where a straight line L1 parallel to X-axis to a position P and a straight line L2 parallel to the Y-axis from the position P to the next position intersect with each other at right angles is virtually set, and then, as shown in FIGS. 9 and 11, an arc-shaped movement trajectory C of the tool T moving around the virtual corner portion which corresponds to the parameter values is calculated (a movement trajectory C obtained assuming that the movement of the tool T is controlled by the drive control section 17 on the basis of the parameters is calculated). The movement trajectory C touches the straight lines L1 and L2 and is more distant from the virtual corner portion when the grade of the accuracy level is lower.

FIGS. 8(a) and 10(a) and FIGS. 8(b) and 10(b) show a specified speed of the tool T in X-axis direction and a specified speed for the tool T in Y-axis direction, respectively. The speed difference at the corner (corner portion) is larger in FIG. 8 than in FIG. 10. This speed difference is determined depending on the parameter relating to allowable speed difference at corner, and the allowable speed difference at corner is set larger when the grade of the accuracy level is lower and is set lower when the grade of the accuracy level is higher. Further, when the allowable speed difference is larger, the arc-shaped movement trajectory C (the amount of error from the position P) is larger since the movement of the tool T in Y-axis direction is started sooner (see FIGS. 8 and 9), and when the allowable speed difference is smaller, the arc-shaped movement trajectory C (the amount of error from the position P) is smaller since the movement of the tool T in Y-axis direction is started later (see FIGS. 10 and 11). Furthermore, the sooner the movement of the tool T in Y-axis direction is started, the shorter the movement time of the tool T (the machining time) is, and the later the movement of the tool T in Y-axis direction is started, the longer the movement time of the tool T (the machining time) is. Therefore, when the grade of the accuracy level is higher, the amount of error from the position P is smaller but the machining time is longer.

Figure 12:
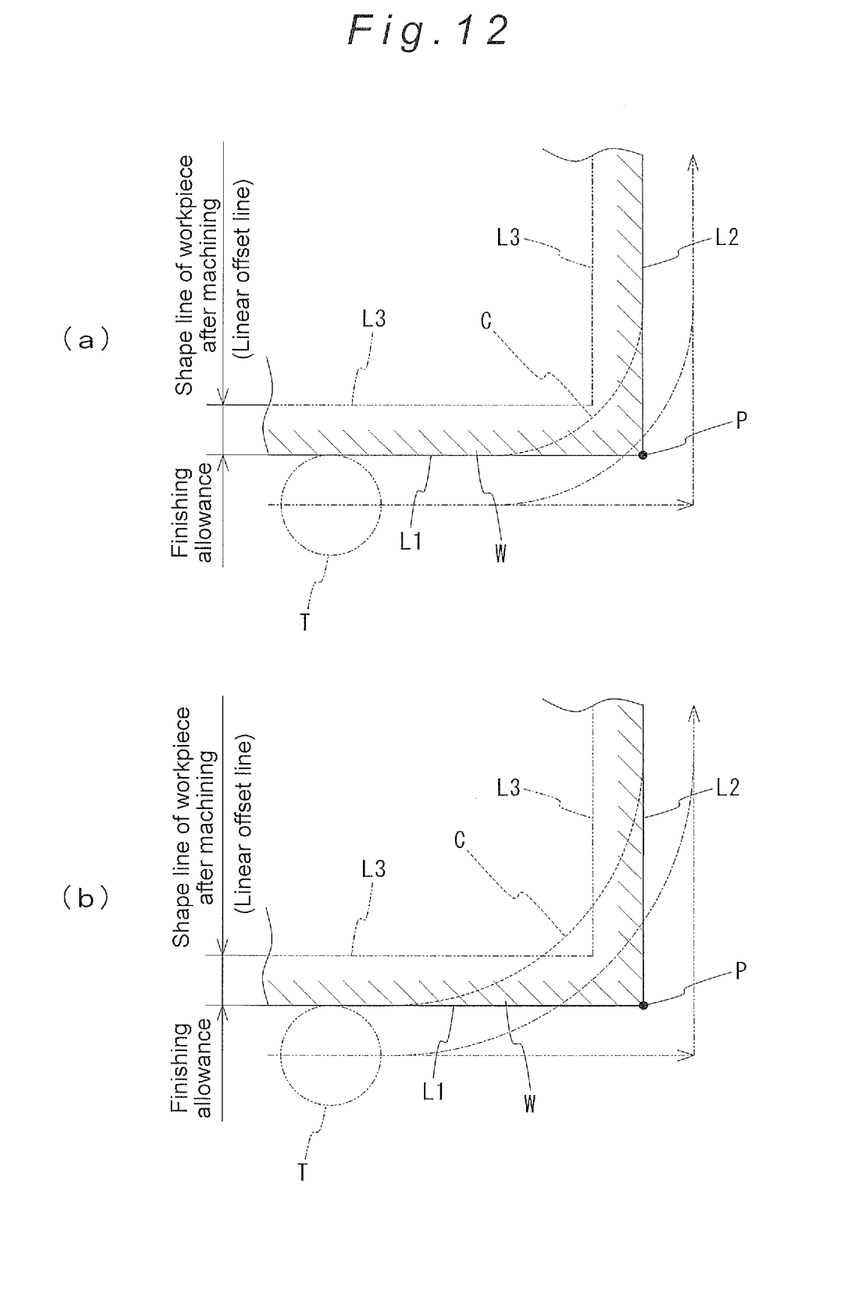
FIG. 12 is an illustration for explaining the parameter setting process in the embodiment.

Subsequently, as shown in FIG. 12, on the basis of the recognized finishing allowance, a linear offset line L3 which is obtained by offsetting the straight lines L1 and L2 inwardly by the finishing allowance, that is, a line representing the shape of workpiece W after machining is calculated (Step S9). Then a check is made whether the calculated movement trajectory C intersects with the linear offset line L3, that is, whether the workpiece W is machined too much (Step S10), and when a determination is made that they do not intersect with each other, the accuracy level is determined to be this accuracy level (L($1 \leq L \leq 9$)) (Step S11) and the process proceeds to Step S14.

The term "inwardly" used above refers to the side on which the movement trajectory C is set. The determination whether the movement trajectory C intersects with the linear offset line L3 can be made by finding whether the movement trajectory C and the linear offset line L3 have any intersection, and when they have an intersection, a determination is made that they intersect with each other. FIG. 12(a) shows a case where the movement trajectory C does not intersect with the linear offset line L3, and FIG. 12(b) shows a case where the movement trajectory C intersects with the linear offset line L3.

On the other hand, when, in Step S10, a determination is made that they intersect with each other, the accuracy level is set to the grade higher by one (L=L+1) (Step S12), and the processings in and after Step S6 are performed again.

Furthermore, when, in Step S2, a determination is made that the machining type is finishing, and, when, in Step S6, a determination is made that the accuracy level is L=10, the accuracy level is determined to be accuracy level 10, that is, the highest grade of accuracy level, the value of each of the parameters when the accuracy level is accuracy level 10 is calculated on the basis of the linear equations for the parameters stored in the parameter storage section 14 (Step S13). In Step S14, the parameter values calculated in Step S7 or in Step S13 are set as the set values of the parameters, and the set values of the parameters are stored in the set parameter storage section 16. Then the series of processings described above is terminated.

The drive control section 17 is configured with an axial movement command generating section 18, an acceleration/deceleration calculating section 19, an axial specified position generating section 20 and a motor control section 21, and controls a drive motor configuring the feed mechanism 30 on the basis of the operation command and fixed cycle command stored in the analysis result storage section 13 and on the basis of the set values of the parameters stored in the set parameters storage section 16, thereby relatively moving the tool T and the workpiece W.

The axial movement command generating section 18 generates a command relating to movement position and feed speed of the tool T on the basis of the operation command and the fixed cycle command and on the basis of the set values of the parameters (for example, the parameters relating to allowable speed difference at corner and maximum machining speed).

The acceleration/deceleration calculating section 19 performs an acceleration/deceleration operation for the specified speed on the basis of the command relating to movement position and feed speed of the tool T generated by the axial movement command generating section 18 and on the basis of the set values of the parameters (for example, maximum acceleration for acceleration/deceleration before interpolation, acceleration change time for acceleration/deceleration before interpolation, allowable amount of acceleration change, rate of jerk change time for smooth-bell-shaped acceleration/deceleration, allowable acceleration for circular interpolation and allowable speed difference at corner).

The axial specified position generating section 20 generates a specified position for each feed axis on the basis of the values obtained from the acceleration/deceleration operation in the acceleration/deceleration calculating section 19 and on the basis of the set values of the parameters (for example, allowable amount of acceleration change for each axis at linear corner, time constant for acceleration/deceleration after interpolation and maximum machining speed).

The motor control section 21 controls the drive motor of the feed mechanism 30 on the basis of the specified positions for the feed axes generated by the axial specified position generating section 20.

When the tool T is moved at the intersection portion of two linear movement paths L1 and L2 by the axial movement command generating section 18, the acceleration/deceleration calculating section 19, the axial specified position generating section 20 and the motor control section 21, as shown in FIGS. 9, 11 and 12, the tool T is moved along an arc-shaped movement trajectory C which touches the linear movement paths L1 and L2 and which corresponds to the set values of the parameters. The movement trajectory C is more distant from the intersection portion when the grade of the accuracy level is lower since the lower the grade of the accuracy level is, the sooner the operation related to the linear movement path L2 is started. Further, when the set values of the parameters correspond to the highest grade of accuracy level, the movement trajectory C is very small or no movement trajectory C is set. When no movement trajectory C is set, the tool T is moved so as to pass through the position P.

According to the controller for NC machine tool 1 of the embodiment thus configured, a machining program and parameters are stored in advance in the program storage section 11 and in the parameter storage section 14, respectively. When the machining program stored in the program storage section 11 is preformed on the controller 1, the program analyzing section 12 analyzes the machining program stored in the machining program storage section 11 and extracts an operation command relating to movement position and feed speed of the tool T and a fixed cycle command, and the extracted commands are stored in the analysis result storage section 13.

Thereafter, the parameter setting section 15 determines the accuracy level and sets the values of the parameters corresponding to the determined accuracy level on the basis of the fixed cycle command stored in the analysis result storage section 13 and the parameters stored in the parameter storage section 14, and the set values of the parameters are stored in the set parameter storage section 16.

Subsequently, the drive motor of the feed mechanism 30 is controlled by the drive control section 17 on the basis of the fixed cycle command stored in the analysis result storage section 13 and the set values of the parameters stored in the set parameter storage section 16, thereby relatively moving the tool T and the workpiece W. At this time, at an intersection portion of two linear movement paths L1 and L2, the tool T is relatively moved along a movement trajectory C which touches the linear movement paths L1 and L2 and is more distant from the intersection portion when the grade of the accuracy level is lower.

Thus, according to the controller for NC machine tool 1 of the embodiment, when the machining type is finishing, the accuracy level is determined to be the highest grade of accuracy level and the parameters corresponding to the determined accuracy level are set, and when the machining type is rough cutting, the accuracy level is determined to be the lowest grade of accuracy level among such accuracy levels that the arc-shaped movement trajectory C do not intersect with the linear offset line L3 and the parameters corresponding to the determined accuracy level are set. Therefore, it is possible to shorten the machining time as much as possible while maintaining machining accuracy.

Further, in the determination of the accuracy level, a check is initially made whether the finishing allowance is larger than a predetermined value, and when a determination is made that it is larger than the predetermined value, the accuracy level is raised grade by grade from the lowest grade (accuracy level 1), and when a determination is made that it is smaller than the predetermined value, the accuracy level is raised grade by grade from an intermediate grade (in the embodiment, accuracy level 5). Then the accuracy level is determined to be the lowest grade of accuracy level among such accuracy levels that the movement trajectory C does not intersect with the linear offset line L3. Therefore, it is prevented that the accuracy level is raised in sequence from the lowest grade even when the finishing allowance is small, and thereby it is possible to efficiently determine the accuracy level to be such an accuracy level that the machining time can be shortened without machining the workpiece W too much.

Thus, one embodiment of the present invention has been described. However, a specific mode in which the present invention can be realized is not limited thereto.

In the above embodiment, when the parameter setting section 15 determines the accuracy level, the size of the finishing allowance is checked, and when the finishing allowance is small, the accuracy level is raised grade by grade from accuracy level 5 that is an intermediate grade of accuracy level and is determined to be the lowest grade of accuracy level among such accuracy levels that the movement trajectory C does not intersect with the linear offset line L3. However, the above-mentioned intermediate accuracy level is not limited to accuracy level 5. For example, the intermediate accuracy level may be accuracy level 3 or 4 or accuracy level 6 or 7.

Further, when the parameter setting section 15 determines the accuracy level, the size of the finishing allowance is checked, and the accuracy level is raised grade by grade from the lowest grade when the finishing allowance is large, and is raised grade by grade from an intermediate grade when the finishing allowance is small, and then is determined to be the lowest grade of accuracy level among such accuracy levels that the movement trajectory C does not intersect with the linear offset line L3. However, the accuracy level may be always raised grade by grade from the lowest grade without checking the size of the finishing allowance.

The parameter setting section 15 may be configured to set the parameters for a machining in which a cutting is performed a plurality of times. As a machining in which a cutting is performed a plurality of times, for example, a series of machinings in which finishing is performed after rough cutting is performed as shown in FIG. 2(c) and rough cutting in which a cutting is performed a plurality of times are given. In this case, the parameter setting section 15 is configured to set the parameters for each cutting in rough cutting by performing a series of processings shown in FIGS. 13 and 14.

Figure 13:
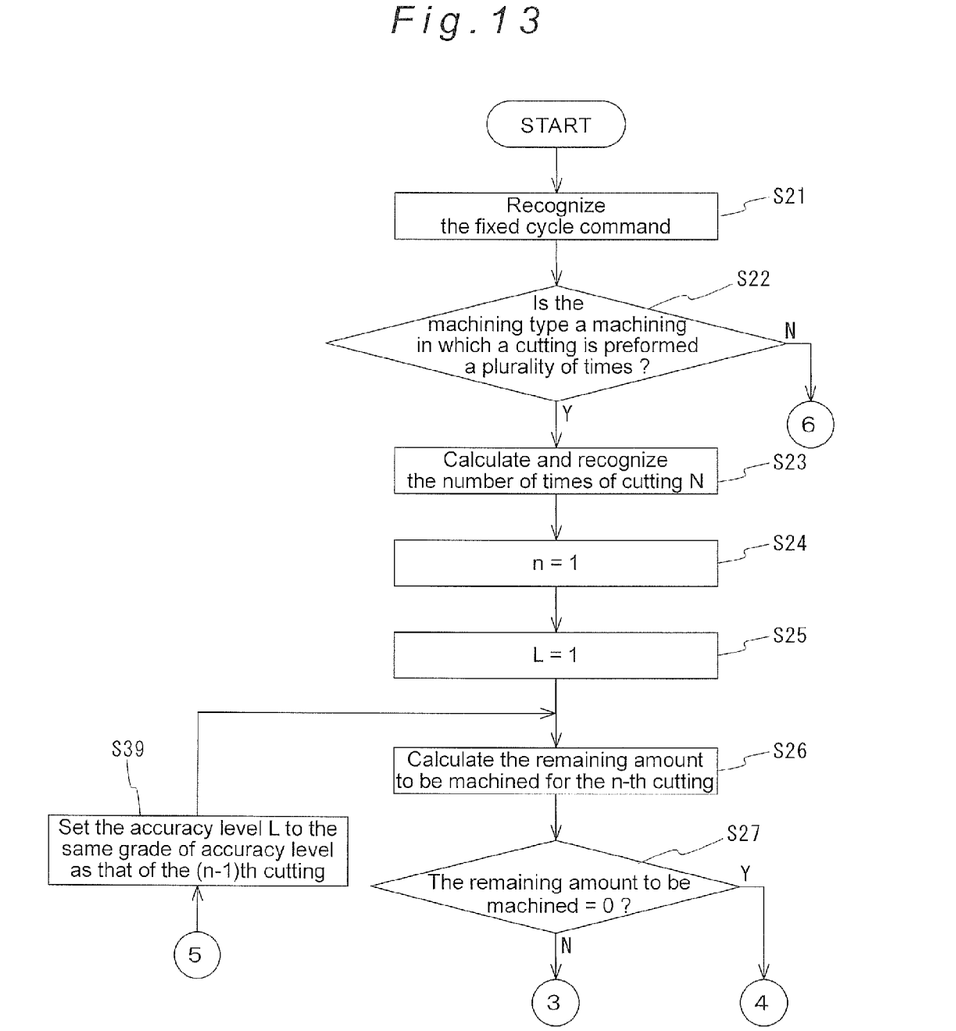
FIG. 13 is a flow chart showing a series of processings in the parameter setting section according to an alternative embodiment of the present invention.
Figure 14:
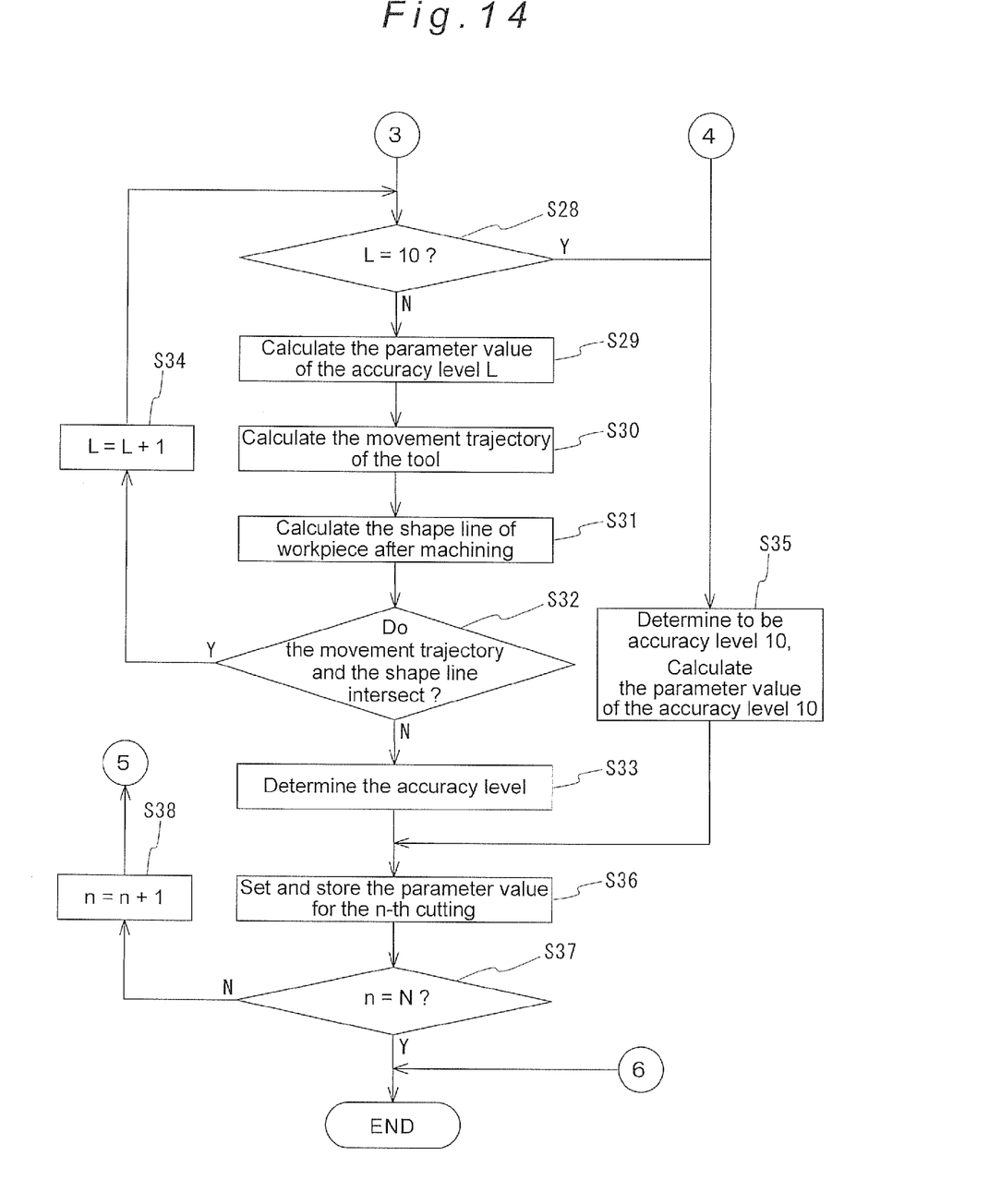
FIG. 14 is a flow chart showing the series of processings in the parameter setting section according the alternative embodiment of the present invention.

The parameter setting section 15 initially recognizes a fixed cycle command, that is, various data included in the fixed cycle command (for example, machining type, finishing allowance, feed speed for rough cutting, depth of cut per cutting in rough cutting, total depth of cut etc.) (Step S21), and then checks whether the recognized machining type is a machining in which a cutting is preformed a plurality of times (Step S22). When a determination is made that it is a machining in which a cutting is preformed a plurality of times, the parameter setting section 15 calculates the number of times of cutting N in rough cutting on the basis of the recognized finishing allowance, depth of cut per cutting in rough cutting, and total depth of cut, and recognizes the calculated number (Step S23). The number of times of cutting N in rough cutting can be calculated from, for example, N=(U−S)/T, wherein S is the finishing allowance, T is the depth of cut per cutting in rough cutting, and U is the total depth of cut.

Figure 15:
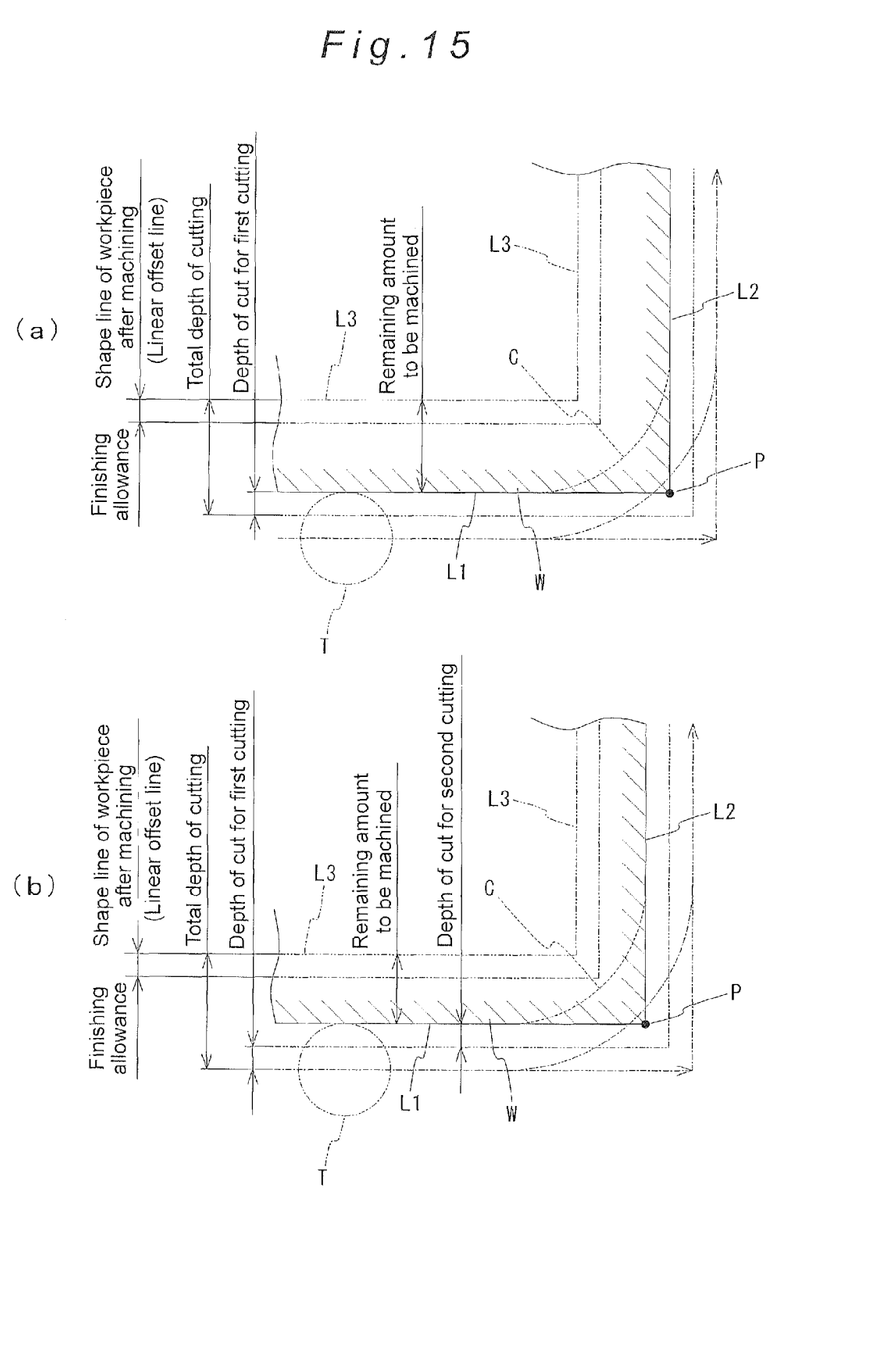
FIG. 15 is an illustration for explaining the parameter setting process according to the alternative embodiment of the present invention.

Thereafter, a counter n is set to 1 (Step S24), and the accuracy level is set to L=1 (Step S25), and the remaining amount to be machined is calculated for the first cutting (Step S26). The remaining amount to be machined refers to, as shown in FIG. 15(a), the amount to be machined which remains after the first cutting, and which includes the amount to be machined in finishing, that is, the finishing allowance. The remaining amount to be machined can be calculated by subtracting the recognized depth of cut per cutting from the recognized total depth of cut.

Subsequently, a check is made whether the calculated remaining amount to be machined is zero (Step S27). When a determination is made that it is not zero, a check is made whether the accuracy level is L=10 (the highest grade of accuracy level) (Step S28). When a determination is made that the accuracy level is not L=10, the values of the parameters when the accuracy level is L ($1 \leq L \leq 9$) are calculated on the basis of the linear equations for the parameters (Step S29), and a movement trajectory C of the tool T is calculated in the same manner as described above on the basis of the calculated parameter values and the recognized feed speed (Step S30).

Then, as shown in FIG. 15(a), a linear offset line L3 (a line representing the shape of the workpiece W after all machining is completed) which is obtained by offsetting the two straight lines L1 and L2 inwardly by the recognized remaining amount to be machined is calculated on the basis of the calculated remaining amount to be machined (Step S31), and then a check is made whether the calculated movement trajectory C intersects with the calculated linear offset line L3 (Step S32).

When a determination is made that they do not intersect with each other, the accuracy level is determined to be this accuracy level (L($1 \leq L \leq 9$)) (Step S33), and the process proceeds to Step S36.

On the other hand, when, in Step S32, a determination is made that they intersect with each other, the accuracy level is raised to the grade higher by one (L=L+1) (Step S34), and the processings in and after Step S28 are preformed again.

When, in Step S27, a determination is made that the remaining amount to be machined is zero, and when, in Step S28, a determination is made that the accuracy level is L=10, the accuracy level is determined to be 10 (the highest grade of accuracy level). In this case, the values of the parameters when the accuracy level is 10 are calculated on the basis of the linear equations for the parameters stored in the parameter storage section 14 (Step S35). In Step S36, the parameter values calculated in Step S29 or in Step S35 are set as the set values of the parameters for the first cutting, and the set values of the parameters are stored in the set parameter storage section 16.

Then, while updating the counter n, the parameters are set for each cutting and the set values are stored in the set parameter storage section 16 (Steps S37, S38). For each of cuttings after the first cutting, the accuracy level is set to the same grade of accuracy level as that of the preceding cutting (Step S39), and the processings in and after Step S26 are performed. When the parameters have been set for all cuttings, that is, when the counter n becomes equal with the recognized number of times of cutting N (Step S37), the series of processings described above is terminated.

Further, also when, in Step S22, a determination is made that the machining type is not a machining in which a cutting is performed a plurality of times, the process is terminated. In this case, the parameters are set by performing the processings shown in FIGS. 5 and 6.

The amount to be machined (the remaining amount to be machined) which remains after the second cutting can be calculated by subtracting the depth of cut for the first cutting the depth of cut for the second cutting from the total depth of cutting as shown in FIG. 15(b). Further, the movement trajectory C at this time is shown in FIG. 15(b). The remaining amount to be machined and the movement trajectory C can be calculated in the same manner as the above also for cuttings after the second cutting.

The parameter setting section 15 sets the parameters for each cutting in rough cutting in this manner. Further, in a case where finishing is preformed after rough cutting is performed, for the cutting in the finishing, the parameter setting section 15 determines the accuracy level to be 10 (the highest grade of accuracy level) and calculates the values of the parameters when the accuracy level is 10 on the basis of the linear equations for the parameters stored in the parameter storage section 14 and sets the calculated parameter values as the set values of the parameters, and the set values of the parameters are stored in the set parameter storage section 16.

A determination whether finishing is performed after rough cutting can be made by checking whether the machining type included in the fixed cycle command is a series of machinings in which finishing is performed after rough cutting or a machining in which only rough cutting is performed. Further, because, in a case where finishing is performed after rough cutting, the fixed cycle command includes not only data on the rough cutting but also data on the finishing, the determination can be also made by checking whether data on finishing is included in the fixed cycle command.

Further, similarly to the above, the drive control section 17 controls the drive motor configuring the feed mechanism 30 on the basis of the operation command and fixed cycle command stored in the analysis result storage section 13 and on the basis of the set values of the parameters relating to cuttings in rough cutting or the set values of the parameters related to cuttings in rough cutting and relating to a cutting in finishing, which are stored in the set parameter storage section 16.

Also when the parameter setting section 15 and the drive control section 17 are thus configured, similarly to the above, it is possible to shorten the machining time as much as possible while maintaining machining accuracy. Further, since, in determining the accuracy level for cuttings after the first cutting, the accuracy level is raised grade by grade from the accuracy level of the preceding cutting and is determined to be the lowest grade of accuracy level among such accuracy levels that the movement trajectory C does not intersect with the linear offset line 3, it is prevented that the accuracy level is raised in sequence from the lowest grade every time, and thereby it is possible to efficiently determine the accuracy level to be such an accuracy level that the machining time can be shorten without machining the workpiece W too much.

In the determination of the accuracy level, the accuracy level may be determined to be the lowest grade of accuracy level among such accuracy levels that the movement trajectory C does not intersect with the linear offset line L3 in such a manner that, similarly to the above, a check is made whether the remaining amount to be machined is larger than a predetermined value and when a determination is made that it is larger than the predetermined value, the accuracy level is raised grade by grade from the lowest grade (accuracy level 1) and when a determination is made that it is smaller than the predetermined value, the accuracy level is raised grade by grade from an intermediate grade (for example, accuracy level 5) instead of raising the accuracy level grade by grade from the grade of the preceding cutting.

Further, in the above embodiments, for the parameters, linear equations showing the relationship between accuracy level and parameter values are stored in the parameter storage section 14. However, the format of the parameters is not limited thereto, and parameter values for each accuracy level may be stored in the parameter storage section 14 instead. In this case, the parameter setting section 15 stores, as the set values of the parameters, the parameter values corresponding to the determined accuracy level in the set parameter storage section 16.

The parameter setting section 15 is configured to, when determining that the movement trajectory C intersects with the linear offset line L3, raise the accuracy level to the grade higher by one and check whether the movement trajectory C at the time of this accuracy level intersects with the linear offset line L3. However, the parameter setting section 15 may be configured to, when determining that the movement trajectory C intersects with the linear offset line 3, to calculate how much they intersect with each other, that is, how much the workpiece W is excessively machined, and raise the accuracy level by two grade when the amount of excessive machining is too large.

Furthermore, the parameter setting section 15 may be configured to recognize machining type from a G code included in the fixed cycle command or from data on finishing allowance included in the fixed cycle command. Further, the determination of accuracy level and the setting of parameters may be performed when the workpiece W is actually machined or when a machining simulation is preformed.

REFERENCE SIGNS LIST

1 Controller for NC machine tool
11 Program storage section
12 Program analyzing section
13 Analysis result storage section
14 Parameter storage section
15 Parameter setting section
16 Set parameter storage section
17 Drive control section
18 Axial movement command generating section
19 Acceleration/deceleration calculating section
20 Axial specified position generating section
21 Motor control section
30 Feed mechanism

CITATION LIST

Patent Literature
Japanese Unexamined Patent Application Publication No. 10-63329

The invention claimed is:
1. A controller for machine tool which is provided for a machine tool having a feed mechanism for relatively moving a tool and a workpiece, and which controls the operation of the feed mechanism according to a machining program related to a fixed cycle,
the controller for machine tool comprising:
program storage means for storing the machining program related to the fixed cycle;
program analyzing means for analyzing the machining program stored in the program storage means and extracting a fixed cycle command;
parameter setting means for determining an accuracy level on the basis of the fixed cycle command extracted by the program analyzing means and setting parameters which correspond to the accuracy level and relate to the control of the operation of the feed mechanism, the accuracy level being graded into a plurality of grades depending on how high machining accuracy is prioritized as compared with machining time in machining; and drive control means for controlling the feed mechanism on the basis of the fixed cycle command extracted by the program analyzing means and the parameters set by the parameter setting means, and thereby relatively moving the tool, wherein:

the drive control means is configured to, for an intersection portion of two linear movement paths, relatively move the tool along an arc-shaped movement trajectory which depends on the parameters set by the parameter setting means, the movement trajectory touching the linear movement paths and being more distant from the intersection portion when the grade of the accuracy level is lower;

the parameter setting means is configured to recognize machining type on the basis of the fixed cycle command;

when the recognized machining type is finishing, the parameter setting means determines the accuracy level to be the highest grade of accuracy level and sets the parameters corresponding to the determined accuracy level; and when the recognized machining type is rough cutting, the parameter setting means virtually sets a vertical corner portion where two straight lines intersect with each other, and then determines the accuracy level to be the lowest grade of accuracy level among such accuracy levels that an arc-shaped movement trajectory of the tool moving around the virtual corner portion which depends on the parameters does not intersect with a linear offset line which is obtained by offsetting the two straight lines inwardly by a finishing allowance which is recognized from the fixed cycle command, and sets the parameters corresponding to the determined accuracy level, the movement trajectory touching the straight lines and being more distant from the virtual corner portion when the grade of the accuracy level is lower.

2. The controller for machine tool according to claim 1, wherein the parameter setting means is configured to, in the determination of the accuracy level when the recognized machining type is rough cutting, raise the accuracy level grade by grade from the lowest grade and thereby determine the accuracy level to the lowest grade of accuracy level among such accuracy levels that the movement trajectory does not intersect with the linear offset line.

3. The controller for machine tool according to claim 2, wherein the parameter setting means is configured to, in the determination of the accuracy level when the recognized machining type is rough cutting, initially check whether the finishing allowance is larger than a predetermined value, and when determining that it is larger than the predetermined value, raise the accuracy level grade by grade from the lowest grade and thereby determine the accuracy level to be the lowest grade of accuracy level among such accuracy levels that the movement trajectory does not intersect with the linear offset line, and when determining that it is smaller than the predetermined value, raise the accuracy level grade by grade from an intermediate grade and thereby determine the accuracy level to be the lowest grade of accuracy level among such accuracy levels that the movement trajectory does not intersect with the linear offset line.

4. The controller for machine tool according to claim 1, wherein the parameter setting means is configured to, when the machining type recognized on the basis of the fixed cycle command is a machining in which a cutting is performed a plurality of times, for cuttings corresponding to rough cutting thereof, determine, for each cutting, the accuracy level to be the lowest grade of accuracy level among such accuracy levels that the movement trajectory does not interest with a linear offset line which is obtained by offsetting the two straight lines inwardly by a remaining amount to be machined which is the amount to be machined to remain after the cutting, and set the parameters corresponding to the determined accuracy level, and for a cutting corresponding to finishing thereof, determine the accuracy level to be the highest grade of accuracy level and set the parameters corresponding to the determined accuracy level, and the drive control means is configured to, at an intersection of two linear movement paths, relatively move the tool along an arc-shaped movement trajectory which depends on the parameters set by the parameter setting means for each cutting.

5. The controller for machine tool according to claim 4, wherein the parameter setting section is configured to, in determining the accuracy level for each cutting, raise the accuracy level grade by grade from the lowest grade and thereby determine the accuracy level to be the lowest grade of accuracy level among such accuracy levels that the movement trajectory does not intersect with the linear offset line.

6. The controller for machine tool according to claim 5, wherein the parameter setting section is configured to, in determining the accuracy level for cutting after first cutting, raise the accuracy level grade by grade from the grade of the accuracy level in the preceding cutting and thereby determine the accuracy level to be the lowest grade of accuracy level among such accuracy levels that the movement trajectory does not intersect with the linear offset line.

7. The controller for machine tool according to claim 5, wherein the parameter setting section is configured to, in determining the accuracy level for each cutting, initially check whether the remaining amount to be machined is larger than a predetermined value, and when determining that it is larger than the predetermined value, raise the accuracy level grade by grade from the lowest grade and thereby determine the accuracy level to be the lowest grade of accuracy level among such accuracy levels that the movement trajectory does not intersect with the linear offset line, and when determining that it is smaller than the predetermined value, raise the accuracy level grade by grade from a intermediate grade and thereby determine the accuracy level to be the lowest grade of accuracy level among such accuracy levels that the movement trajectory does not intersect with the linear offset line.

* * * * *